United States Patent
Yallapragada

(10) Patent No.: US 7,698,510 B2
(45) Date of Patent: Apr. 13, 2010

(54) SYSTEMS AND METHODS FOR IDENTIFYING AND REGISTERING A RANGE OF VIRTUAL MEMORY

(75) Inventor: Srisailendra Yallapragada, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 11/159,979

(22) Filed: Jun. 22, 2005

(65) Prior Publication Data

US 2006/0294320 A1 Dec. 28, 2006

(51) Int. Cl.
G06F 12/00 (2006.01)
G06F 13/00 (2006.01)
G06F 13/28 (2006.01)

(52) U.S. Cl. ..................... 711/147; 711/153
(58) Field of Classification Search ................... 711/147
See application file for complete search history.

(56) References Cited

U.S. PATENT DOCUMENTS 5,301,288 A * 4/1994 Newman et al. ............ 711/202
5,687,370 A * 11/1997 Garst et al. ................. 707/206
5,729,710 A * 3/1998 Magee et al. ............... 711/203
5,875,487 A * 2/1999 Schwartz et al. ............ 711/202

OTHER PUBLICATIONS

InformIT, C++ Reference Guide: Virtual Memory and Memory Mapping, Mar. 18, 2005, http://www.informit.com/guides/content.aspx?g=cplusplus&seqNum=213.*

* cited by examiner

Primary Examiner—Matt Kim
Assistant Examiner—Ralph A Verderamo, III

(57) ABSTRACT

The invention provides apparatus and methods for registering shared memory objects. An exemplary embodiment of the invention is a method for registering a shared memory object are presented including: locating the shared memory object, the shared memory object having a first size and a first virtual address; finding a shared memory region associated with the shared memory object, the shared memory region having a second size and a second virtual address, the second virtual address returned as a unique identifier; and registering the shared memory object using the unique identifier. In some embodiments, the methods further include: calculating a memory offset for the shared memory region; and registering the shared memory range using the memory offset. In some embodiments, the methods further include: storing the unique identifier, the second size, and the memory offset in a persistent shared memory data structure.

31 Claims, 3 Drawing Sheets

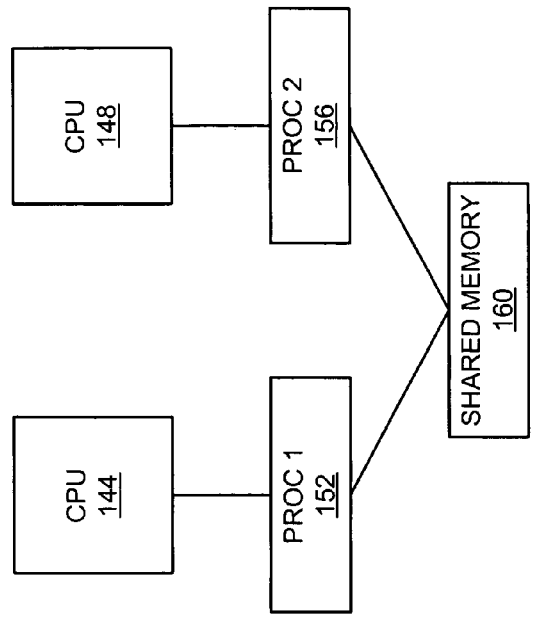
FIG. 1C
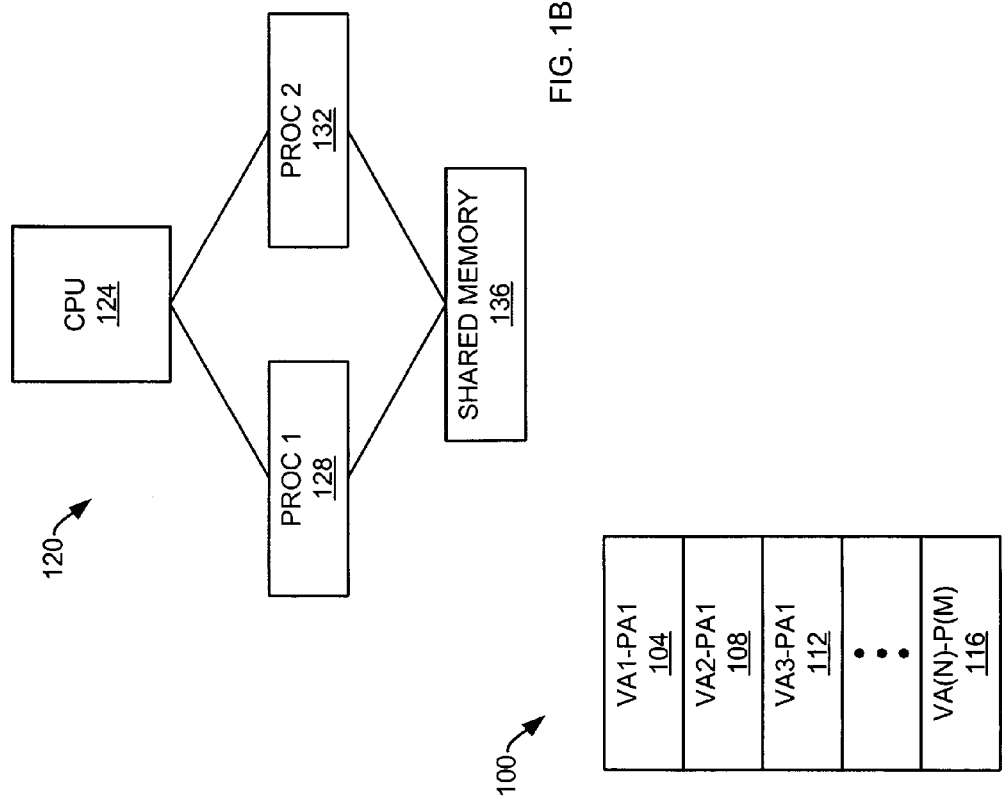
FIG. 1B
FIG. 1A

SYSTEMS AND METHODS FOR IDENTIFYING AND REGISTERING A RANGE OF VIRTUAL MEMORY

BACKGROUND OF THE INVENTION

As computer processing and related technologies continue to evolve, memory and storage requirements continue to increase. Where once a few thousand bytes of memory could sufficiently handle an operating system and related processes, now many gigabytes of memory may be required in some complex processing systems. Furthermore, in some distributed systems, memory structures may be shared thus increasing the complexity of memory management. As such, the complexity of these systems requires efficient and flexible memory management schemes.

As can be appreciated, even relatively simple systems typically process many millions of instructions per second. In some or all of those processes, some memory components may be accessed. Managing those memory components properly, therefore, is critical to maintain on-going processes. In shared memory systems, memory data structures may be created to share, for example, a common address space for two or more processes. In some systems, sharing data in this manner allows processes to exchange data without passing through a CPU. Thus, higher transfer speeds may be attained. However, shared memory systems require still more complex memory management techniques in order to maintain ongoing processes. In shared memory systems, memory addressing may be managed by using searchable tables to store memory allocation and location information.

In distributed memory systems, as can be appreciated, still more sophisticated memory management techniques must be utilized. Memory address information stored in searchable tables as well as related memory data structures may be used in order to attain data transfer efficiencies similar to local systems. One type of distributed memory communication technique is remote direct memory access (RDMA). RDMA allows data to be transmitted from the memory of one computer to the memory of another computer without passing through either device's CPU, without needing extensive buffering, and without calling system kernel functions. INFINIBAND™ is an example of a form of RDMA. Additionally, in distributed memory systems, memory management may, in some examples, compound drastically.

For example, in a distributed memory system where two processes are configured with a shared memory space, at least two entries (one for each process) in a searchable table may be required to appropriately address a shared memory space. In some examples, even more entries per process may be required. As the number of processes requiring shared memory increases, so too do the number of entries corresponding to shared memory. As a result, when a shared memory space is accessed by a process, the process must first search every shared memory entry in order to appropriately access its corresponding shared memory space. It may be desirable, therefore, to reduce the number of entries corresponding to shared memory resulting in greater memory management efficiency. Therefore, systems and method for identifying and registering a range of virtual memory are presented.

SUMMARY OF INVENTION

The invention provides apparatus and methods for registering shared memory objects. An exemplary embodiment of the invention is a method for registering a shared memory object are presented including: locating the shared memory object, the shared memory object having a first size and a first virtual address; finding a shared memory region associated with the shared memory object, the shared memory region having a second size and a second virtual address, the second virtual address returned as a unique identifier; and registering the shared memory object using the unique identifier. In some embodiments, the methods further include: calculating a memory offset for the shared memory region; and registering the shared memory range using the memory offset. In some embodiments, the methods further include: storing the unique identifier, the second size, and the memory offset in a persistent shared memory data structure. In some embodiments, the methods further include: before the finding a shared memory region, finding a pseudo-region, the pseudo-region having a third size and a third virtual address; comparing the first size with the third size; and if the first size is greater than the third size, returning an error. In some embodiments, the methods further include: before the registering the shared memory object, determining whether the shared memory object has a corresponding registry entry; and if the shared memory object does not have the corresponding registry entry, creating the corresponding registry entry.

In other embodiments, shared memory data structures for use with a shared memory system are presented including: a unique identifier portion; a size portion; and an offset portion. In some embodiments, the shared memory data structure is persistent with a corresponding virtual address, the corresponding virtual address associated with a shared memory object. In some embodiments, the size portion is dynamically configurable.

In other embodiments, shared memory systems are presented including: at least one shared memory object component; a shared memory region component; a shared memory data structure component; and an association engine for associating the shared memory data structure component with the at least one shared memory object component and with the shared memory region. In some embodiments, the at least one shared memory object component comprises a first size and a first virtual address. In some embodiments, the shared memory region component comprises a second size and a second virtual address, the second virtual address configured as a unique identifier. In some embodiments, the shared memory data structure component includes: a unique identifier portion; a size portion; a count; and an offset portion. In some embodiments, shared memory systems further include a pseudo-region component, the pseudo-region component having a third size and a third virtual address.

Advantages of the invention include reducing the number of entries corresponding to shared memory thus resulting in greater memory management efficiency.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A-1C are diagrammatic representations of computer systems in accordance with embodiments of the present invention;

DETAILED DESCRIPTION OF EMBODIMENTS

Figure 2:
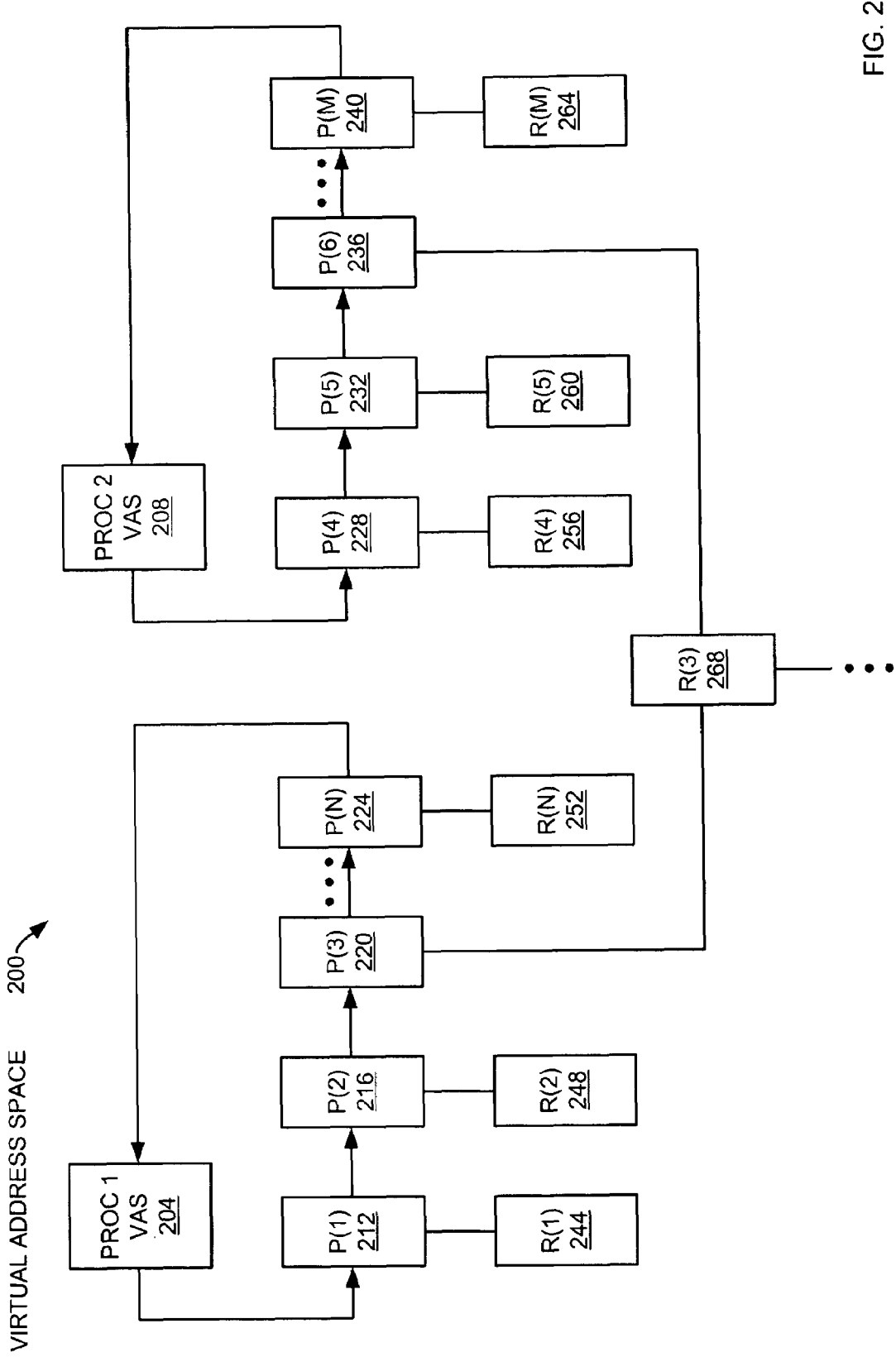
FIG. 2 is a diagrammatic representation of a virtual address space in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

FIGS. 1A-1C are diagrammatic representations of computer systems in accordance with embodiments of the present invention. Referring first to FIG. 1A, a virtual address table 100 is illustrated in accordance with an embodiment of the present invention. A virtual address table contains any number of virtual addresses corresponding to physical addresses 104-116 in accordance with user preferences. In memory systems, virtual addresses provide a contiguous memory space for a given process that point to physical memory space that may or may not be contiguous. By using this method, memory efficiencies may be achieved. In this example, one or more virtual pages (e.g. VA1, VA2, and VA3) may point to a shared memory page (PA1). As can be appreciated, the illustrated example is not intended to be limiting. As such, in other examples, a single physical address may correspond to a single virtual address. Further, as illustrated, each virtual address includes a corresponding entry in the virtual page table.

Referring next to FIG. 1B, a computing system 120 having a single CPU 124 is illustrated in accordance with embodiments of the present invention. In particular, CPU 124 includes a first process 128 and a second process 132. Both processes, as illustrated, are in electronic communication with shared memory space 136. As can be appreciated, any number of processes may be in electronic communication with a shared memory space in accordance with user preferences and system capability. In many processes, it is advantageous to share data. For example, a process may calculate a sum which sum is used, in turn, by another process to calculate an average. In order to more efficiently transfer this data, some processes may access a shared memory space. Thus, one process may create a data structure that may be used immediately by a second process. One way of tracking processes and shared memory space is through table entries containing sufficient information to identify memory relationships.

Referring to FIG. 1C, a distributed computing system 140 having two CPU's 144-148 is illustrated in accordance with embodiments of the present invention. In particular, CPU 144 includes a first process 152 and CPU 148 includes a second process 156. Both processes, as illustrated, are in electronic communication with shared memory space 160. As can be appreciated, in embodiments of the present invention, any number of CPU's having any number of processes in electronic communication with one or more shared memory spaces may be utilized without departing from the present invention. As above, one way of managing processes and shared memory space is through table entries containing sufficient information to identify memory relationships. In distributed systems, however, additional management functions may be necessary. Methods of managing (i.e. registering) shared memory will be discussed in further detail below for FIG. 3.

FIG. 2 is a diagrammatic representation of a virtual address space 200 in accordance with embodiments of the present invention. In particular, this example illustrates shared memory between two processes as, for example, distributed computing system 140 (see FIG. 1C). In a virtual memory system, virtual address space is the entire memory a given process may use. A virtual address space includes a linked list of pseudo-regions (p-regions). Thus, process virtual address spaces 204 and 208 may include any number of p-regions 212-240 in accordance with user implementation preferences. P-regions may be used to configure regions of memory as, for example, regions 244-264. As can be appreciated, there may be any number of p-regions including, for example: stacks, heaps, memory mapped files, and shared memory. As illustrated, p-regions 220 and 236 are connected with shared memory region 268. As such, p-regions 220 and 236 each point to the same shared memory region 268. Shared memory region 268 may, in turn, be shared by other p-regions belonging to other process virtual address spaces.

Figure 3:
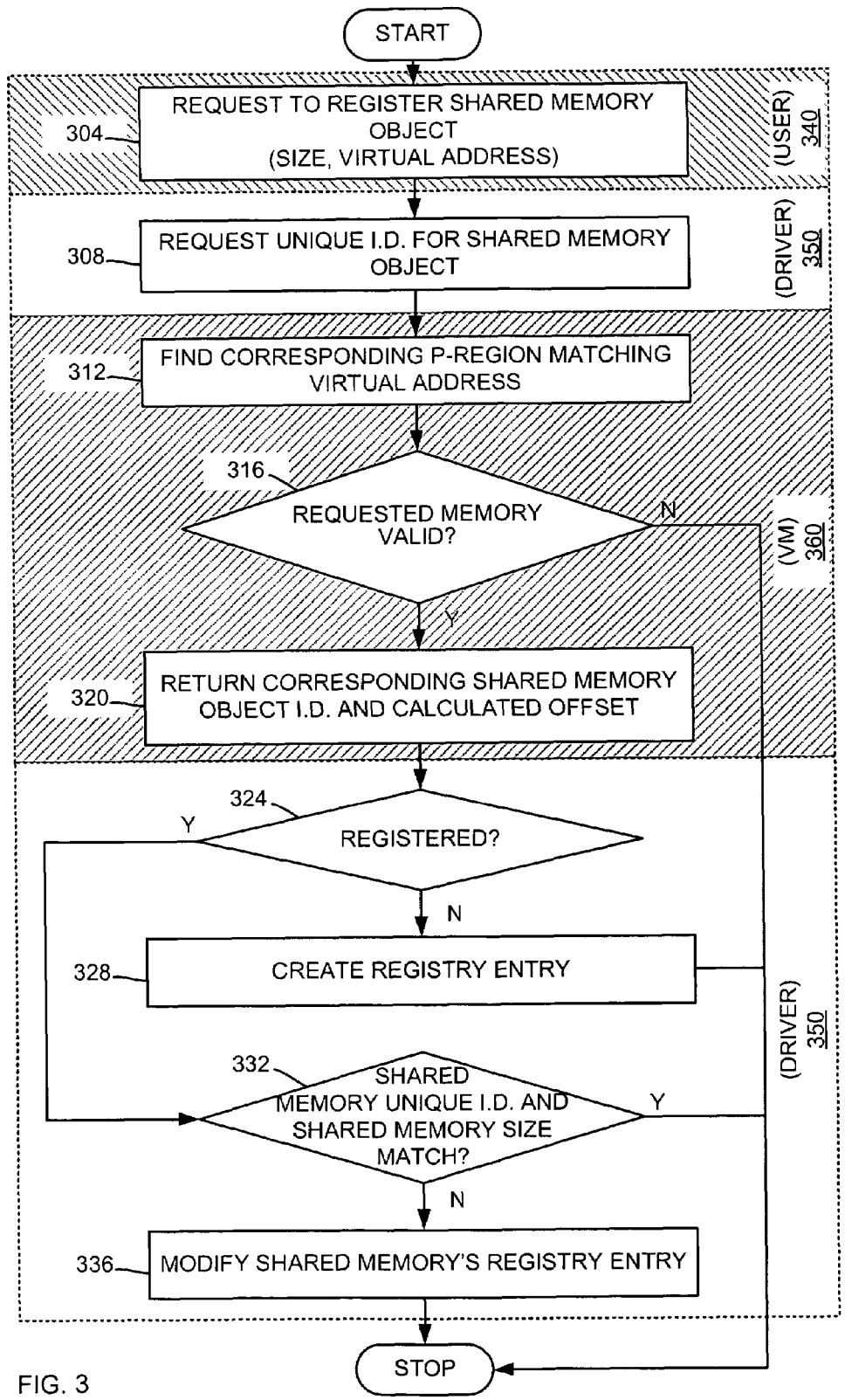
FIG. 3 is flowchart illustrating a method for registering a shared memory data structure accordance with embodiments of the present invention.

FIG. 3 is flowchart illustrating a method for registering a shared memory data structure accordance with embodiments of the present invention. At a first step 304, a process or user 340 requests to register a shared memory object. A shared memory object is an object that contains data for use by one or more other processes. Registering a request for a shared memory object includes supplying a size parameter and a virtual address parameter. A size parameter is useful in some embodiments where some error correction is desired. A virtual address parameter is useful in some embodiments to correctly identify a shared memory object. At a next step 308, driver 350 receives shared memory registration request from user 340 and, in turn, issues a unique I.D. request corresponding to the virtual address to virtual memory (VM) system 360. As can be appreciated, virtual addresses, not physical addresses are used by processes to address memory. As such, processes utilize contiguous virtual memory address space even though corresponding physical memory space may not be contiguous. Virtual memory addressing is generally well-known in the art.

At a next step 312, VM system 360 finds a corresponding p-region matching the virtual address. A p-region, as noted above, may be used by a process to configure memory. As can be appreciated, there may be any number of p-regions including, for example: stacks, heaps, memory mapped files, and shared memory. In the illustrated flowchart, the corresponding p-region is a shared memory p-region. At a next step 316, an optional decision may be made to determine whether the requested memory is valid. In some embodiments, validity may be determined where memory size is less than or equal to the p-regions size. A validity check step may be utilized so that improper registrations may be avoided. Thus, for example, where a registered memory size is greater than a corresponding p-region size, some portion of the registered memory (e.g. that portion extending outside of the corresponding p-region) may be unintentionally exposed to other processes. In that example, a portion of registered shared memory may improperly overlap other memory, which may not be intended for sharing. In some scenarios, simple data corruption may result. In other scenarios, data security may be breached. By checking requested size against p-region size, these difficulties may be avoided.

If, at a step 316, requested memory is invalid, the method ends thus avoiding improper registration. In some embodiments, a flag may be generated to alert administrators of potential problems. If, at a step 316, requested memory is valid, the method continues to a step 320 to return a corresponding shared memory object identifier and to calculate an offset. A corresponding shared memory object identifier, in some embodiments, is a unique object I.D. For example, a kernel virtual address pointing to a corresponding shared memory region may be returned as a corresponding shared memory object identifier. In this manner, a level of indirection may provide greater opacity between VM 360 and driver 350. In some embodiments, opacity results in higher security for shared memory objects.

An offset represents a sub-portion of a range of shared memory that is being registered. For example, for a shared memory object 4K bytes in size, any portion or sub-portion of the shared memory object may be shared with one or more processes. In considering these processes, one or more processes may overlap the shared memory object in whole or in part. Thus, if a first process utilizes all of 4K bytes of the shared memory object and a second processes utilizes, for example, 1K bytes of the shared memory object, then an offset for the second process, which, in some embodiments, is simply an arithmetic difference between the memory sizes, may be applied so that a new registry entry may be avoided. Rather, an existing registry entry may be utilized in concert with a calculated offset resulting in some memory management efficiencies. In some embodiments, a cookie, having a unique identifier and an offset, may be generated. In some embodiments the cookie may persist for the life of the shared memory object. In other embodiments, the cookie may include a memory size parameter.

At a next step 324, driver 350 determines whether a shared memory object has been previously registered by another process. That is, whether a registry entry exists for the shared memory object of interest. If the shared memory object is not registered, a registry entry may be created at a step 328 whereupon the method ends. If a registry entry does exist, the method determines whether the shared memory object's size and shared memory size match. As noted above, different processes sharing a shared memory object may utilize different portions of a shared memory object. Where a process shares a memory size less than or equal to the shared memory object, an offset may be calculated as in a step 320. However, in those instances where an allocated memory size is greater than a registered shared memory object, the method may modify the registered shared memory object's registry entry so that it may contain the requested memory range. Unlike error check above as in a step 316, the method assumes now that the registered memory range is valid and thus, must modify the shared memory object space to accommodate the requested memory range. The method then ends.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method, performed by a computer, for registering a shared memory object having a first size and a first virtual address, the method comprising:

finding a shared memory region associated with the shared memory object, the shared memory region having a second size and a second virtual address, the second virtual address returned as a unique identifier; wherein the second virtual address points to the shared memory region; and registering the shared memory object using the unique identifier, wherein a first process accesses the shared memory object by use of a registry entry having the unique identifier and a second process accesses the shared memory object by use of the registry entry and a memory offset, wherein the memory offset is calculated based on a portion utilized by the first process and the second process in the shared memory object.

2. The method of claim 1 further comprising:

calculating the memory offset for the shared memory object; and registering a shared memory range using the memory offset.

3. The method of claim 1 further comprising:

storing the unique identifier, the second size, and the memory offset in a persistent shared memory data structure.

4. The method of claim 1 further comprising:

before the finding a shared memory region, finding a pseudo-region, the pseudo-region having a third size and a third virtual address;

comparing the first size with the third size; and if the first size is greater than the third size, returning an error.

5. The method of claim 4 further comprising:

if the first size is greater than the second size, modifying the second virtual address such that the first size is equal to or less than the second size.

6. The method of claim 1 further comprising:

before the registering the shared memory object, determining whether the shared memory object has a corresponding registry entry; and if the shared memory object does not have the corresponding registry entry, creating the corresponding registry entry.

7. The method of claim 6 wherein the corresponding registry entry is stored in a searchable table.

8. The method of claim 1 further comprising:

incrementing a counter for each shared memory object that is registered;

decrementing the counter for each shared memory object that is released; and releasing the shared memory region when the counter equals zero.

9. The method of claim 1 wherein the shared memory region is configured to support remote direct memory access (RDMA).

10. The method of claim 1, wherein the shared memory region includes the first virtual address of the shared memory object.

11. A Memory having a shared memory data structure stored thereon, the shared memory data structure for use with a shared memory system, the shared memory data structure comprising:
- a unique identifier portion that identifies a virtual address of a shared memory object;
- a size portion that indicates a size of the shared memory object; and
- an offset portion for the shared memory object, whose value is a function of a size of portion of the shared memory object used by a first and second process.

12. The shared memory data structure of claim 11 wherein the shared memory data structure is persistent with a corresponding virtual address, the corresponding virtual address associated with the shared memory object.

13. The shared memory data structure of claim 11 further comprising a count, the count representing a total number of shared memory objects associated with the shared memory data structure.

14. The shared memory data structure of claim 11 wherein the size portion is dynamically configurable.

15. The shared memory data structure of claim 11 wherein the shared memory data structure is configured to support remote direct memory access (RDMA).

16. A shared memory system comprising:
- a processor; and
- memory having stored thereon:
  - at least one shared memory object component;
  - a shared memory region component;
  - a shared memory data structure component;
- wherein the processor is configured by instructions to associate the shared memory data structure component with the at least one shared memory object component and with the shared memory region, wherein a first process addresses the shared memory object component by the use of a registry entry and a second process addresses the shared memory object component by use of the registry entry and an offset portion, wherein the registry entry is unique across the first and the second process, wherein the offset portion is calculated based on a portion utilized by the first process and the second process in the shared memory object component.

17. The shared memory system of claim 16 wherein the at least one shared memory object component comprises a first size and a first virtual address.

18. The shared memory system of claim 16 wherein the shared memory region component comprises a second size and a second virtual address, the second virtual address configured as a unique identifier.

19. The shared memory system of claim 16 wherein the shared memory data structure component comprises:
- a unique identifier portion;
- a size portion;
- a count; and
- the offset portion.

20. The shared memory system of claim 16 further comprising a pseudo-region component, the pseudo-region component having a third size and a third virtual address.

21. The shared memory system of claim 16 wherein the shared memory system is configured to support remote direct memory access (RDMA).

22. A computer program product for use in conjunction with a computer system for registering a shared memory object having a first size and a first virtual address, the computer program product comprising a computer readable storage medium and a computer program mechanism embedded therein, the computer program mechanism comprising:
- instructions for finding a shared memory region associated with the shared memory object, the shared memory region having a second size and a second virtual address, the second virtual address returned as a unique identifier, wherein the second virtual address points to the shared memory region; and
- instructions for registering the shared memory object by using the unique identifier, wherein a first process addresses the shared memory object by use of a registry entry having the unique identifier and a second process addresses the share memory object by use of the registry entry and a memory offset, wherein the memory offset is calculated based on a portion utilized by the first process and the second process in the shared memory object.

23. The computer program product of claim 22 further comprising:
- instructions for calculating the memory offset for the shared memory object; and
- instructions for registering the shared memory range using the memory offset.

24. The computer program product of claim 22 further comprising:
- instructions for storing the unique identifier, the second size, and the memory offset in a persistent shared memory data structure.

25. The computer program product of claim 22 further comprising:
- instructions for finding a pseudo-region, the pseudo-region having a third size and a third virtual address;
- instructions for comparing the first size with the third size; and
- if the first size is greater than the third size, instructions for returning an error.

26. The computer program product of claim 22 further comprising:
- instructions for determining whether the shared memory object has a corresponding registry entry; and
- if the shared memory object does not have a corresponding registry entry, instructions for creating the corresponding registry entry.

27. The computer program product of claim 26 further comprising:
- if the first size is greater than the second size, instructions for modifying the second virtual address such that the first size is equal to or less than the second size.

28. The computer program product of claim 26 wherein the corresponding registry entry is stored in a searchable table.

29. The computer program product of claim 22 further comprising:
- instructions for incrementing a counter for each shared memory object that is registered;
- instructions for decrementing the counter for each shared memory object that is released; and
- instructions for releasing the shared memory region when the counter equals zero.

30. The computer program product of claim 22 wherein the shared memory region is configured to support remote direct memory access (RDMA).

31. The computer program product of claim 22, wherein the second virtual address is a kernel mode virtual address.

* * * * *

UNITED STATES PATENT AND TRADEMARK OFFICE
CERTIFICATE OF CORRECTION

| | |
|---|---|
| PATENT NO. | : 7,698,510 B2 |
| APPLICATION NO. | : 11/159979 |
| DATED | : April 13, 2010 |
| INVENTOR(S) | : Srisailendra Yallapragada |

It is certified that error appears in the above-identified patent and that said Letters Patent is hereby corrected as shown below:

In column 7, line 1, in Claim 11, delete "Memory" and insert -- memory --, therefor.

In column 7, line 10, in Claim 11, delete "of portion" and insert -- of a portion --, therefor.

In column 8, line 22, in Claim 23, delete "the shared" and insert -- a shared --, therefor.

Signed and Sealed this
Thirty-first Day of May, 2011

David J. Kappos
*Director of the United States Patent and Trademark Office*